United States Patent
Yamaguchi et al.

[11] Patent Number: 6,165,535
[45] Date of Patent: Dec. 26, 2000

[54] WHEAT STARCH WITH NOVEL CHARACTERISTICS

[75] Inventors: Isao Yamaguchi, Shimozuma; Chikako Otobe, Tsukuba; Tomohiko Ushiyama, Susaka; Takashi Yanagisawa; Hidefumi Seko, both of Tsukuba; Yoichi Amano, Wakaba-machi; Hisashi Yoshida, Tsukuba, all of Japan

[73] Assignee: Director General of National Agriculture Research Center, Ministry of Agriculture, Forestry and Fisheries, Japan

[21] Appl. No.: 09/038,893

[22] Filed: Mar. 11, 1998

[30] Foreign Application Priority Data

Mar. 12, 1997 [JP] Japan ..................... 9-058054

[51] Int. Cl.$^7$ .................................................. A23L 1/0522
[52] U.S. Cl. ............................. 426/578; 426/94; 426/549
[58] Field of Search ............................. 426/94, 549, 578

[56] References Cited

FOREIGN PATENT DOCUMENTS

WO 98/15621 A1 4/1998 WIPO .

OTHER PUBLICATIONS

Nakamura et al., "Production of Waxy (amylose–Free) Wheats", *Mol. Gen. Genet.* 248:253–259.

Katsuyuki Hayakawa et al., "Quality Characteristics of Waxy Hexaploid Wheat (Triticum aestivum L.): Properties of Starch Gelatinization and Retrogradation", *Cereal Chemistry*, vol. 74, No. 5, 1997, pp. 576–580.

Kiribuchi–Otobe et al., "Production of 1–12 Hexploid Wheats with Waxy Endosperm Character", *Cereal Chemistry*, vol. 74, No. 1, 1997, pp. 72–74.

*Primary Examiner*—Helen Pratt
*Attorney, Agent, or Firm*—Fish & Richardson P.C.

[57] ABSTRACT

The present invention relates to wheat starch which reaches the peak viscosity at 75 to 85° C. and whose amylose content is 0.8% or more and 2.5% or less, as well as to foods containing the same. Wheat flour which is of glutinous properties and excellent in viscosity stability is provided.

3 Claims, 1 Drawing Sheet

WHEAT STARCH WITH NOVEL CHARACTERISTICS

FIELD OF THE INVENTION

The present invention relates to wheat starch with novel characteristics and foods containing the same.

BACKGROUND OF THE INVENTION

The endosperm starch of cereal seeds is usually constituted of amylose that is a straight-chain molecule and amylopectin that is a molecule with a large number of branches. If starch is constituted almost exclusively of amylopectin, the starch exhibits the characteristics of glutinous properties such as initiation of gelatinization at a lower temperatures than usual starch, and difficult hardening of starch even after cooling, etc. Therefore, glutinous starch having such characteristics is utilized in a wide variety of applications in the field of food industry.

Conventionally, glutinous corn starch has been exclusively utilized as glutinous starch, but the lack of viscosity stability due to the weakness of starch granule structure constitutes a disadvantage for some applications, so viscosity stability should be imparted artificially by chemical treatment such as cross-linkage using phosphates.

However, processed starch on which viscosity stability has been conferred by chemical treatment is costly and thus priced high, and further such processed starch is against consumers' preference to natural products in the field of food.

SUMMARY OF THE INVENTION

To resolve such inconvenience, the object of the present invention is to provide natural glutinous starch excellent in viscosity stability.

As a result of their eager research, the present inventors found wheat containing starch having novel characteristics in seeds, and based on this finding they arrived at the present invention.

That is, the present invention relates to wheat starch having the following properties:
(a) it maintains at least 80% of the peak viscosity 2 minutes after the peak viscosity is reached; and
(b) its amylose content is less than 3%.

The present invention further relates to foods containing the above-described wheat starch.

DETAILED DESCRIPTION OF THE INVENTION

Figure 1:
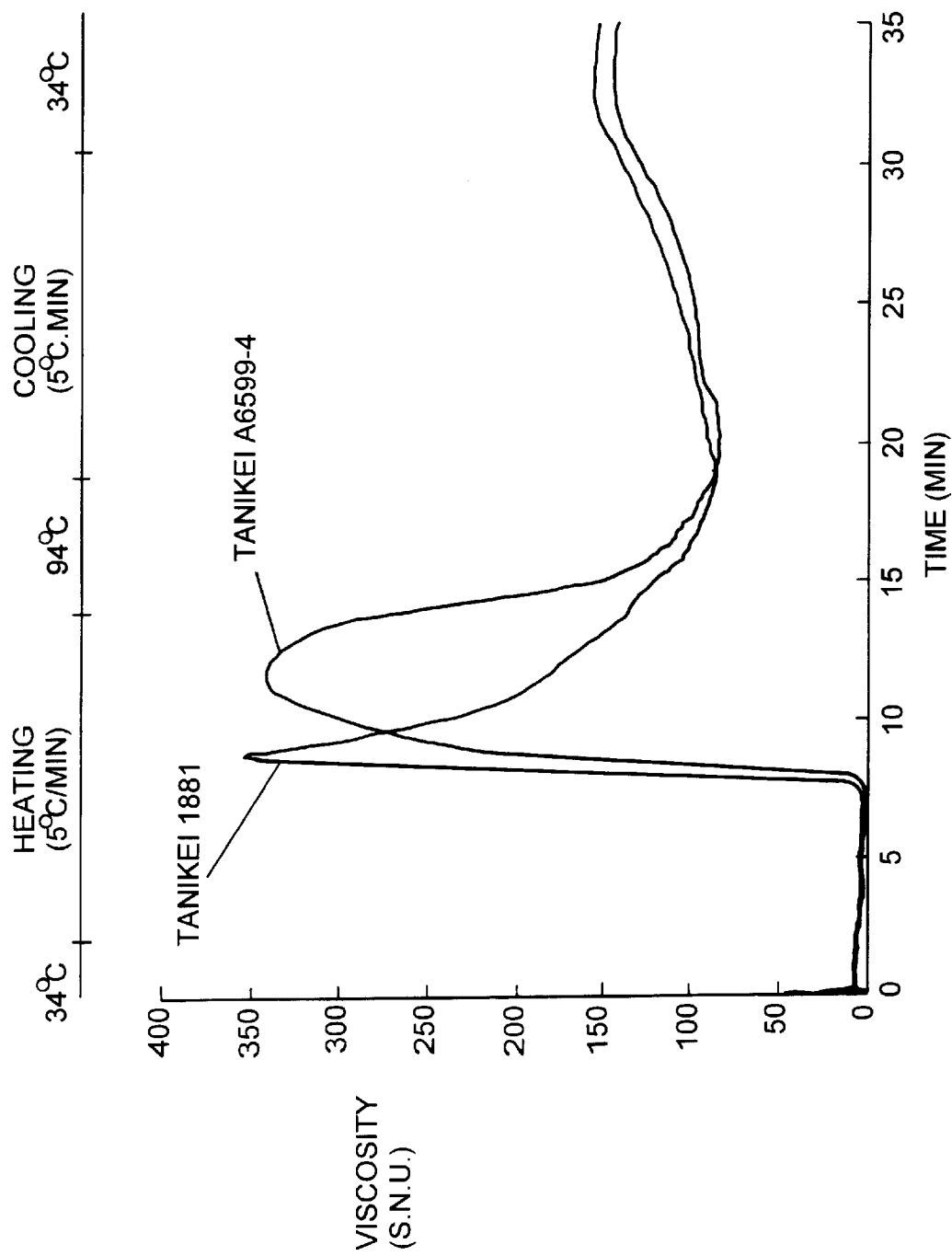
FIG. 1 shows viscosity curves of starch of "Tanikei H1881" and "Tanikei A6599-4" as determined by Rapid Visco Analyser.

Hereinafter, the present invention is described in detail.
(1) The starch of the present invention
The starch of the present invention has the following properties:
(a) it is excellent in viscosity stability; and
(b) it has glutinous properties.

By the phrase "excellent in viscosity stability" it is meant that a change in viscosity is slow after the peak viscosity is reached, that is, its viscosity is changed with a broad curve when its viscosity is measured with Rapid Visco Analyser. More specifically, it is meant that it maintains at least 80% of the peak viscosity 2 minutes after the peak viscosity is reached. By the phrase "has glutinous properties" it is meant that the content of amylose in starch is low, more specifically the amylose content is less than 3%.

Conventionally, glutinous wheat has been known, but its viscosity stability is low, and there was not known any glutinous wheat maintaining at least 80% of the peak viscosity 2 minutes after the peak viscosity is reached. Accordingly, the starch of the present invention is novel starch different from any conventional starch.

Although the properties (a) and (b) above can be referred to as properties of the starch of the present invention, it is preferable for the starch to have the additional property that the temperature at which the peak viscosity is reached is 75 to 85° C.

The starch of the present invention can be obtained from specific wheat. One strain belonging to such wheat is "Tanikei A6599-4". Seeds of "Tanikei A6599-4" have been deposited and stored in Gene Bank, National Institute of Agrobiological Resources, Ministry of Agriculture, Forestry and Fisheries, Japan (Storage No. 00090237).

Such wheat can be produced by treating, with a mutagen, seeds of a wheat strain belonging to "Tanikei A6099" and selecting, at least once, seeds with a low content of amylose from the progeny seeds. Seeds of such a wheat strain belonging to "Tanikei A6099" have been deposited and stored in Gene Bank, National Institute of Agrobiological Resources, Ministry of Agriculture, Forestry and Fisheries (Storage No. 00090674). The mutagen used may be any mutagen capable of inducing a mutation in plants, and use can be made of e.g. sodium azide, ethylmethane sulfonate, methylnitrosourea etc., among which sodium azide is particularly preferable. The method of treatment with the mutagen may be any method capable of inducing a mutation in plants, for example, mention can be made of a method of immersing seeds in a solution containing the mutagen. In the case of immersing seeds in a solution containing the mutagen, the concentration of sodium azide in the solution is preferably 4 to 8 mM, and the period of immersion is preferably 2 to 4 hours. Whether the content of amylose in seeds is high or low can be determined by measuring their amylose content with a commercial autoanalyzer or by staining the seeds with iodine/potassium iodide. These methods are used to select seeds with a low content of amylose. Such selection is carried out preferably two or three times, although there is no particular limitation on the number of times such selection is carried out.

The starch of the present invention can be obtained in a usual manner from such starch without requiring any special method.

(2) The foods of the present invention
The foods of the present invention may be in any form insofar as they contain said starch, and mention can be made of e.g. noodles, retort-packed foods, frozen foods, marine products (boiled fish paste etc.), deep-fried foods, snacks, bread, fresh sweets etc., among which noodles, retort-packed foods etc. can be exemplified as preferable foods.

The amount of the starch of the present invention added to foods varies depending on the type of foods. For example, in the case of noodles, the starch added every 100 parts by weight of foods is preferably 5 to 20 parts by weight, and in the case of retort-packed foods, the starch added every 100 parts by weight of foods is preferably 5 to 10 parts by weight.

EXAMPLES

Hereinafter, the present invention is described in more detail with reference to the Examples.

Example 1

(1) In November 1991, 1400 seeds of "Tanikei A6099", that is, an ordinary strain of wheat with a low amylose content, were immersed in distilled water for 4 hours and then subjected to mutagenesis treatment by immersion in 4 mM sodium azide solution for 2 hours. The sodium azide solution was prepared by dissolving sodium azide in a buffer, pH 3 consisting of 0.1 M potassium hydrogen phthalate and 0.1 N hydrochloric acid. The seeds ($M_1$) after treatment were washed well with running water and sown in a field.

(2) In June 1992, all the ears (about 1500 ears) of the $M_1$ plant were harvested, and their seeds (1 seed from each ear) were sown as a population of $M_2$ seeds in a field in October in the same year.

(3) In June 1993, the whole (1098 individuals) of $M_2$ were harvested and threshed to give $M_3$ seeds. The $M_3$ seeds were collected such that one group of seeds consisted of seeds from 15 individuals (about 20 seeds/individual), and each group was subjected to preliminary selection for glutinous properties. The preliminary selection was carried out by paring seeds in each group with a parer and staining them with iodine/potassium iodide (0.2% KI, 0.04% $I_2$) for 2 minutes and then in distilled water for 30 minutes. The results indicated the presence of 19 groups with weakly stained seeds (seeds with possible glutinous properties) among seeds stained deep blue violet. Then, a part of 285 individuals in total in the 19 groups was powdered and analyzed for amylose content by use of an autoanalyzer. As a result, 5 individuals with a lower content of amylose than in "Tanikei A6099" were selected. Because it was considered that the amylose content in an individual was segregated in this generation, progeny was produced by selfing, and 20 seeds ($M_3$ seeds) from each of the 5 individuals selected from $M_2$ were sown as one strain in a vinyl plastic hothouse.

(4) In June 1994, the five $M_3$ strains were harvested, and in October in the same year, $M_4$ strains (the five $M_4$ strains from each $M_3$ strain) were sown respectively.

(5) In June 1995, each of the $M_4$ strains was harvested and a part of $M_5$ seeds obtained by threshing each individual was powdered and analyzed for amylose content with an autoanalyzer. As a result, one strain derived from one individual in the 5 individuals selected from $M_2$ was selected as having glutinous properties. Hereinafter, this strain is referred to as "Tanikei A6599-4". Analysis of the viscosity characteristics of starch isolated from "Tanikei A6599-4" by Rapid Visco Analyser (RVA-3D, Newport Scientific Pty., Ltd.) revealed that the starch is of glutinous properties, while having superior viscosity stability to conventional starch (FIG. 1).

(6) In October 1995, "Tanikei A6599-4" was sown and $M_6$ seeds of "Tanikei A6599-4" were obtained in June 1996 by selfing. A part of the seeds was powdered and analyzed for amylose and viscosity characteristics in the same manner as for the $M_5$ seeds. As a result, the characteristics of glutinous properties and superior viscosity stability were maintained and it was thus confirmed that these characteristics were fixed in "Tanikei A6599-4".

Example 2

Wheat of glutinous properties (strain: "Tanikei H1881") harvested in June 1995 in a Kannondai field in National Agriculturel Research Center (Tsukuba City, Ibaraki Pref., Japan) and variety "Tanikei A6599-4" were powdered in a Brabender Flour Mill. The resulting wheat flour was passed through a screen of 100 mesh size to isolate starch. Dough was prepared by adding 24 ml of 2% NaCl solution to 45 g of the resulting wheat flour and kneading it and was then rubbed in water to prepare a starch suspension. It was left overnight in a refrigerator and centrifuged, and the starch precipitated at the bottom was recovered. The purity of the recovered starch was raised by repeating re-suspension and centrifugation at least twice.

A mixture of 60 ml chloroform and 30 ml methanol was added to 3 g of the starch, and the mixture was stirred for 3 hours and filtered, and the residue on the filter was dried to give degreased starch. 10 ml distilled water and 10 ml of 5 N potassium hydroxide were added to 400 mg of the degreased starch and the mixture was stirred for 30 minutes or more, and distilled water was further added to the gelatinized solution to prepare 100 ml sample. 10 ml of 1 N hydrochloric acid, 5 ml of 0.4 N potassium iodide and 75 ml distilled water were added to 10 ml of the sample, and the mixture was set in an electrode stand for a current titrator and titrated with 0.00157 N potassium iodate. Potato amylose was used as a control, and the content of amylose in the sample was determined. The contents of amylose in "Tanikei H1881" and "Tanikei A6599-4" were as shown in Table 1.

TABLE 1

|  | amylose content |
|---|---|
| Tanikei H1881 | less than 0.8% |
| Tanikei A6599-4 | from 0.8 to 2.5% |

As shown above, the starch of "Tanikei A6599-4" is not completely deficient in amylose but can be regarded as glutinous starch because the content of amylose in conventional wheat starch is 25% or more.

Example 3

3 g of the starch (13.5% moisture content bases, non-degreased) isolated in Example 2 was placed in a vessel, and 25 ml distilled water was added to it. The mixture was stirred and then set in Rapid Visco Analyser. The condition setting in the Rapid Visco Analyser is as follows: 34° C. from 0 to 2 minutes; heating at a rate of 5° C./min. from 2 to 14 minutes; 94° C. from 14 to 19 minutes; cooling at a rate of 5° C./min. from 19 to 31 minutes; and 34° C. from 31 to 35 minutes. As a result, the starch of "Tanikei H1881" and "Tanikei A6599-4" showed viscosity curves respectively as shown in FIG. 1. The gelatinization initiation temperature (pasting temperature) and the temperature at the time of the peak viscosity (peak viscosity temperature) were as shown in Table 2.

TABLE 2

|  | pasting temperature | peak viscosity temperature |
|---|---|---|
| Tanikei H1881 | 60 to 65° C. | 65 to 70° C. |
| Tanikei A6599-4 | 60 to 65° C. | 75 to 85° C. |

As shown above, pasting temperature of the starch of "Tanikei A6599-4" was 60 to 65° C. which was not greatly different from that of "Tanikei H1881", but its peak viscosity temperature was 75 to 85° C. which was higher than 65 to 70° C. for "Tanikei H1881". Further as shown in FIG. 1, the viscosity of the starch of "Tanikei H1881" dropped just after the peak viscosity was reached, and 2 minutes after the peak viscosity was reached, the viscosity dropped at a level of about 60% of the peak viscosity, while the drop in the viscosity of the starch of "Tanikei A6599-4" was slow even after the peak viscosity was reached, and even 2 minutes after the peak viscosity was reached, nearly 90% viscosity of the peak viscosity was maintained. From this, it is evident that the starch of "Tanikei A6599-4" has the characteristics that it has glutinous properties while being excellent in viscosity stability.

Example 4

3 kinds of glutinous starch (starch of "Tanikei H1881", starch of "Tanikei A6599-4", and commercial glutinous corn starch) were gelatinized with Rapid Visco Analyser in the same manner as in Example 3 except that the temperature was raised at 69° C. or less so as not to disintegrate swollen starch granules and that the concentrations of gelatinized liquids were 8% (2 g/25 ml) for "Tanikei H1881" and "Tanikei A6599-4" and 12% (3 g/25 ml) for the glutinous corn starch. Each sample was prepared in duplicate, one of which was left at room temperature for 3 hours after gelatinization (Treatment I) and another was subjected to heating sterilization under pressure (120° C., 15 minutes) in an autoclave after gelatinization and then left for 3 hours (Treatment II). After Treatments I and II, viscosity measurement was conducted under the constant conditions of a temperature of 34° C. for 10 minutes again in Rapid Visco Analyzer, and viscosity after 5 minutes was recorded. As a result, the viscosity of each sample was as shown in Table 3.

TABLE 3

|  | Treatment I (left for 3 hours) | Treatment II (autoclave + left for 3 hours) |
| --- | --- | --- |
| glutinous corn | 98 s.n.u (100) | 58 s.n.u (59) |
| Tanikei H1881 | 87 s.n.u (100) | 66 s.n.u (76) |
| Tanikei A6599-4 | 88 s.n.u (100) | 79 s.n.u (90) |

Note: The values in the parentheses are relative values to viscosity (as 100) in Treatment I.

As shown above, any of the glutinous starch reduced its viscosity in the autoclave treatment, but among these, "Tanikei A6599-4" showed the minimum reduction in viscosity. Therefore, the starch obtained from this strain is more suitable than other glutinous starch for use in conferring viscosity on retort-packed foods which are subjected in a manufacturing step to heating sterilization under pressure.

Example 5

Two kinds of flour, i.e. 100 g of commercial wheat flour (noodle flour produced in Japan) and flour consisting of 90 g of the same commercial wheat flour and 10 g of the starch "Tanikei A6599-4", were used. Each kind of flour was mixed with 2 g sodium chloride and 34 ml distilled water and the mixture was rolled into a sheet of 2 mm in thickness and cut into noodles with No. 10 cutting blade and boiled in boiling water to prepare boiled noodles. As the boiled noodles, two kinds of noodles were prepared which were those boiled for 16 minutes (noodles just after boiled) and those boiled for 10 minutes, then cooled overnight at room temperature and further boiled for 2 minutes (noodles boiled again after storage in the cool).

Boiled noodles were evaluated in an organoleptic test by 4 specialists and by measuring their physical properties with a dynamic-viscoelastometer (Rheographmicro, manufactured by Toyo Seiki Co., Ltd.). In the organoleptic test, boiled noodles of 100% wheat flour was used as standard (5) and feelings in eating (hardness, viscoelasticity, smoothness) were rated in the range of 1 (worst) to 10 (best). The measurement by dynamic viscoelastometer was conducted under the measurement conditions (measurement mode: shear vibration mode, spacer width: 4.6 mm, deforming amplitude: 40 $\mu$m, vibration frequency: 2 Hz). Dynamic modulus G' and dynamic loss G'' were determined from attenuation of amplitude and phase shift between added deformation and detected force, from which loss tangent (G''/G') was calculated. The loss tangent has already been reported to have a positive correlation with feelings in eating of noodles and viscosity of cooked rice (Obuchi et al., Breeding Science vol. 44, supplement 2, page 246, 1995; Otobe et al., Nippon Shokuhin Kagaku Kogaku Kaishi, vol. 42, page 748, 1995). As a result, their grades in the organoleptic test were as shown in Table 4, and the values of loss tangent as determined by the dynamic-viscoelastometer were as shown in Table 5.

TABLE 4

|  |  | 100% wheat flour | 90% wheat flour + 10% starch of Tanikei A6599-4 |
| --- | --- | --- | --- |
| noodles just after boiled | hardness | 5.0 | 6.0 |
|  | viscoelasticity | 5.0 | 6.8 |
|  | smoothness | 5.0 | 6.8 |
| noodles boiled again after storage in the cool | hardness | 5.0 | 5.5 |
|  | viscoelasticity | 5.0 | 6.0 |
|  | smoothness | 5.0 | 6.3 |

TABLE 5

|  | 100% wheat flour | 90% wheat flour + 10% starch of Tanikei A6599-4 |
| --- | --- | --- |
| noodles just after boiled | 0.264 | 0.319 |
| noodles boiled again after storage in the cool | 0.176 | 0.188 |

As is evident from these tables, the starch of "Tanikei A6599-4" has effect on improvement of eating texture of noodles. Further, the starch powder swells at about 80° C. and does not disintegrate immediately, so it can be used to improve eating texture not only for usual boiled noodles but also for instant noodles often cooked with hot water from a pot at about 70 to 80° C.

As illustrated above, the starch of the present invention is of glutinous properties and is excellent in viscosity stability. Because it has glutinous properties, its resistance to retrogradation at low temperatures is excellent, and further by virtue of its superior viscosity stability to that of other glutinous starch, its viscosity reduction hardly occurs in the cooking step. Therefore, it is suitable for application to processed foods such as noodles, retort-packed foods, frozen foods etc.

What is claimed is:

1. A wheat starch comprising the following properties:

(a) having a viscosity 2 minutes after the wheat starch reaches a peak viscosity of at least 80% of the peak viscosity; and (b) comprising an amylose content of about 0.8 to 2.5%, wherein the wheat starch is obtained from a wheat strain derived from wheat strain Tanikei A6099 or a progeny thereof.

2. Foods comprising the wheat starch of claim 1.

3. The wheat starch of claim 1, wherein the wheat strain derived from wheat strain Tanikei A6099 is wheat strain Tanikei A6599-4 having accession number 00090237.

* * * * *